United States Patent Office 2,872,642
Patented Feb. 3, 1959

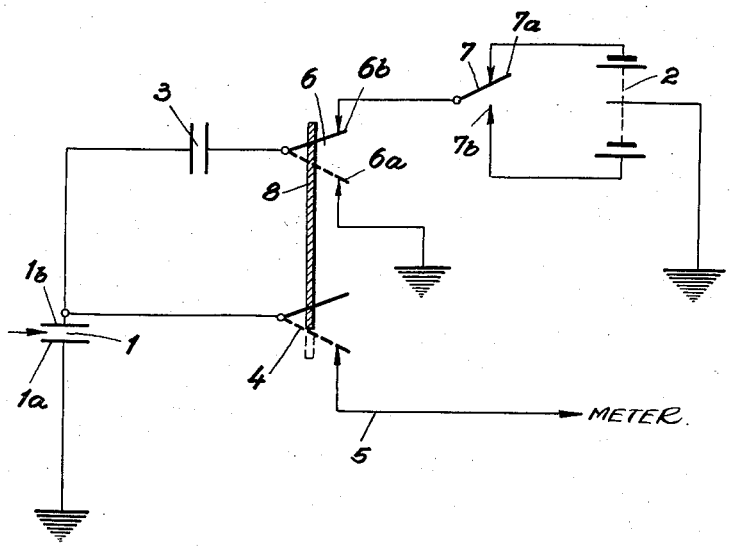

2,872,642

MEASUREMENT OF VERY SMALL ELECTRIC POTENTIAL CHANGES

Ernst Gotthold Breuning, Gerlingen, Kreis Leonberg, Germany, assignor to Lufttechnischen Gesellschaft m. b. H., Stuttgart-Zuffenhausen, Germany, a corporation Application February 27, 1952, Serial No. 273,743

Claims priority, application Germany July 6, 1951

7 Claims. (Cl. 324—111)

This invention relates to improvements in the measurement of very small electric potential changes. It more particularly relates to a method for measuring small electric potential changes in ionization chambers and ionization condensers.

Ionization chambers are conventionally known and used for the measurement of Roentgen rays. These ionization chambers usually consist of a tube in which an insulated wire is stretched and which is connected to an electrometer. The electrometer and the wire are charged with a high potential. When the Roentgen rays enter the ionization chamber which is filled with air an ionization of the air is effected which produces a reduction of the potential previously put on the electrometer. The measurement of the reduction of the potential during a definite period of time gives an accurate indication of the radiation dosage.

In order to determine the ionization of the atmosphere ionization condensers are used. These condensers consist of a probe and a tube. The probe consists of an insulated bar mounted in the center of the tube and connected with an electrometer. The probe and tube which form the ionization condenser are charged to a high potential and air is sucked through the tube by means of a fan or the like. The reduction of the potential is observed on the electrometer and measured during a definite period of time to determine the ionization of the atmosphere.

When using these known methods the potential used in the ionization chambers or ionization condensers must be very high in order to have an effective field intensity. This however, has been found extremely disadvantageous especially for measuring very small changes in potential. The change to be measured in many cases amounts to only a small fraction of the total potential which must be placed on the chamber or condenser and the measuring range of the connected electrometer must be adapted to the high potential originally placed on the chamber or condenser. Thus, for example, if the measuring ionization condenser is charged to a potential of 500 volts an electrometer is required with a measuring range of at least 500 volts. If, however, the changes of the potential to be measured are only fractions of 1 volt they may often not be readable on the scale. This is particularly true when measurements are made in short time intervals. Such measurements over short time intervals are impossible according to conventional methods and long periods of observation are required to be able to establish a change of the potential on the electrometer at all.

One object of this invention is to overcome the aforementioned difficulty.

A further object of this invention is a method for the accurate measurement of extremely small changes in potential when using ionization chambers and condenser. This and still further objects will become apparent from the following description read in conjunction with the drawing which shows a circuit for effecting the measurement in accordance with the invention.

According to the invention the large potential is not placed directly on the measuring instrument such as the ionization chamber or condenser but is placed thereon by induction such as with the use of a condenser. The chamber or condenser is then used to measure the ionization, the potential charge originally placed on the chamber or condenser by induction is then removed and then the measurement is made.

This results in the decided advantage that the measuring range of the measuring instrument connected with the chamber or condenser need no longer be adapted to the high potential of the impressed voltage but may be chosen and calibrated only according to the magnitude of the potential to be measured. This allows very small changes of the charges of the measuring chamber or condenser even with short periods of observation to produce a considerable change or deflection of the measuring instrument.

According to a further embodiment of the invention the charge is induced on the measuring condenser or chamber by means of a highly insulated induction condenser put into the circuit between the voltage source and the measuring condenser.

Furthermore, in order to be able to measure negative as well as positive charges it is advantageous to place a reversing switch in the circuit before the induction condenser by means of which the polarity may be reversed if desired.

The new invention is more fully described with reference to one embodiment of a circuit which is shown in the accompanying drawings.

1 is the measuring condenser to which atmospheric air is conducted, in the direction of the arrow, by means of a fan. The plate 1a of the measuring condenser 1 is grounded. The other plate 1b receives its potential from the source of the potential such as a battery or cell. In contrast to the known methods, the potential is not brought to plate 1b by an electric conducting line but by induction through the insertion of the induction condenser 3 in the circuit. The plate 1b is also connected with the line 5, which leads to the measuring instrument, by way of the switch 4.

The reversing switch 6, whose one contact 6a is grounded and whose other contact 6b is connected with the source of the potential 2 by way of the reversing switch 7, serves to switch the potential on and off. The contacts 7a and 7b of the reversing switch 7 are connected with the free poles of the source of the potential 2, which is grounded in the middle so that, by reversing the switch 7, the polarity of the field of the induction condenser 3 and, thus, the induced field potential of the measuring condenser 1 is reversed.

If, for example, ionization of the air conducted to the measuring condenser 1 is to be measured, a potential is first brought to the induction condenser 3 according to the position of the switch 4 and the reversing switches 6 and 7, as shown in the drawing. The potential is transferred to the measuring condenser 1 by induction. By this a field potential on the measuring condenser 1 is created through which the conducted air, in accordance with the position of the reversing switch 7 transfers its positive or negative ions to the plate 1b of the measuring condenser 1. Then the reversing switch 6 and the switch 4 are reversed, and, by that, the induction condenser 3 is grounded without carrying off the ions of the air transferred on plate 1b. Then the plate 1b of the measuring condenser 1 is connected with the measuring instrument. (Dotted lines show the position of switches 6 and 4.)

As an illustrative example of operation let us assume that the voltage source 2 has a total voltage of 500 volts. Inasmuch as this voltage source 2 is grounded at its center, 250 volts are available for the charging of the induction condenser 3 which has, for example, a capacitance of 100 μμf. The voltage induced on the measuring condenser 1 having a capacitance of for instance 20 μμf. will then be about 200 volts.

Ionized air is now fed for 10 seconds to the measuring condenser 1, which causes a change in the charge of measuring condenser 1 of 0.1 volt. Depending on the polarity selected by the operation of switch 7, the measuring condenser 1 is under voltage of 200 volts plus 0.1 volt or 200 volts minus 0.1 volt.

If it were desired to measure this voltage directly, a measuring instrument having a measuring range of at least about 210 volts would be required. The change in the charge of the measuring condenser 1 brought about by the ionization could then, for all practical purposes, not be read at all after such a short time of 10 seconds.

In accordance with the instant invention, however, the induction condenser 3 is grounded by actuation of switch 6 and in this way the voltage of 200 volts is removed from the measuring condenser 1. There thus remains on the measuring condenser 1 only the voltage of 0.1 volt which is to be measured. This voltage is fed to the measuring instrument, possibly with amplification, by closing switch 4. The measuring instrument in this case need only to have a measuring range of about 1 volt so that even this charging of the measuring condenser 1 to a voltage of only 0.1 volt in the short measuring period of only 10 seconds may be read with the greatest accuracy.

The charge or discharge of the measuring condenser 1 produced by the ions of the air can thus be read off directly on the measuring instrument and the measuring range of the measuring instrument used is thus independent of the magnitude of the required potential and need only correspond to the magnitude of the charge to be measured.

It is suitable to connect the reversing switch 6 with the switch 4 by means of a bridge 8 so that both switches can be operated with one handle for taking measurements.

The new method according to the invention may be used equally advantageous with ionization chambers or any other condensers used for this type of measurement. These ionization chambers and ionization condensers and other condensers are referred to as measuring condensers in the claims.

I claim:

1. Method for the measurement of small electrical charges on a measuring condenser in which the alteration produced by the charge to be measured on a charge previously present on the measuring condenser is measured, which comprises inductively charging the condenser with an attraction charge, thereafter collecting the charge to be measured on one plate of the measuring condenser by exposing the charges to be measured to the influence of the inductively charged measuring condenser, removing the induced charge and measuring the charge collected on said condenser after removal of said inducted charge.

2. Circuit for the measurement of small electrical charges on a measuring condenser which comprises a measuring condenser capable of collecting the charge to be measured when charged with an attracting charge, one plate of the measuring condenser being grounded, an induction condenser having one plate thereof conductively connected to the ungrounded plate of said measuring condenser and the other plate thereof connected with means for alternate connection to a source of potential and ground, said source being an electromotive source, and electric measuring means conductively connected through circuit breaking means to said ungrounded plate of said measuring condenser.

3. Circuit according to claim 2 in which said induction condenser is a highly insulated induction condenser.

4. Circuit according to claim 2 including a pole reversing switch positioned before said source of electromotive source for reversing the polarity of the charge on said induction condenser.

5. Circuit according to claim 2 in which said measuring means is a measuring instrument with measuring range corresponding to the magnitude of the charge to be measured by said measuring condenser.

6. Method according to claim 1, in which said measuring condenser is an ionization condenser.

7. Circuit according to claim 2, in which said measuring condenser is an ionization condenser.

References Cited in the file of this patent

UNITED STATES PATENTS

| | | |
|---|---|---|
| 2,113,011 | White | Apr. 5, 1938 |
| 2,199,757 | Rohde | May 7, 1940 |
| 2,565,892 | Stanton | Aug. 28, 1951 |
| 2,579,277 | Stanton | Dec. 18, 1951 |
| 2,607,528 | McWhirter et al. | Aug. 19, 1952 |
| 2,615,934 | Mackta | Oct. 28, 1952 |
| 2,661,260 | Salzman | Dec. 1, 1953 |

OTHER REFERENCES

Young: Understanding Microwaves, published by John F. Rider Publisher, Inc., New York, N. Y., in 1946, pages 9–12. (Copy in Scientific Library.)

Publication I: "Millivac RF Vacuum Tube Millivolt Meter for TV, FM and Radar," Model MV-1813, Fig. 3, published Jan. 1, 1950. (Copy in Div. 69, Class 171–95–1A.)